United States Patent
Shipp et al.

(10) Patent No.: US 7,203,040 B2
(45) Date of Patent: Apr. 10, 2007

(54) METHOD AND CIRCUIT BREAKER FOR REDUCING ARC FLASH DURING MAINTENANCE IN A LOW VOLTAGE POWER CIRCUIT

(75) Inventors: David D. Shipp, Murrysville, PA (US); Joseph J. Matsko, Beaver, PA (US); James L. Lagree, Robinson Township, PA (US); Michael B. Hodder, Oakville (CA); Ronald E. Vaill, Irwin, PA (US)

(73) Assignee: Gaton Corporation, Cleveland, OH (US)

( * ) Notice: Subject to any disclaimer, the term of this patent is extended or adjusted under 35 U.S.C. 154(b) by 210 days.

(21) Appl. No.: 10/814,596

(22) Filed: Mar. 31, 2004

(65) Prior Publication Data

US 2005/0219775 A1   Oct. 6, 2005

(51) Int. Cl.
  *H02H 3/06* (2006.01)
(52) U.S. Cl. ....................................................... 361/5
(58) Field of Classification Search .................. 361/5
  See application file for complete search history.

(56) References Cited

U.S. PATENT DOCUMENTS

| | | | |
|---|---|---|---|
| 3,110,848 A * | 11/1963 | Hobson, Jr. et al. ........ | 335/273 |
| 3,391,361 A * | 7/1968 | Jencks et al. ................ | 335/176 |
| 3,956,670 A | 5/1976 | Shimp et al. | |
| 4,535,409 A | 8/1985 | Jindrick et al. | |
| 4,866,557 A * | 9/1989 | Fitts et al. ..................... | 361/96 |
| 4,870,532 A | 9/1989 | Beatty, Jr. et al. | |
| 5,933,308 A * | 8/1999 | Garzon ......................... | 361/62 |
| 6,233,128 B1 * | 5/2001 | Spencer et al. ............... | 361/86 |
| 6,252,365 B1 * | 6/2001 | Morris et al. ................ | 318/455 |
| 6,347,027 B1 | 2/2002 | Nelson et al. | |
| 6,777,627 B1 * | 8/2004 | Stevenson ................ | 200/50.21 |
| 2003/0231440 A1 * | 12/2003 | Papallo et al. .................. | 361/3 |
| 2005/0197744 A1 * | 9/2005 | Kalau et al. .................... | 701/1 |

FOREIGN PATENT DOCUMENTS

JP   9-71373   * 3/1997
JP   4111-155235   * 6/1999

* cited by examiner

*Primary Examiner*—Burton S. Mullins
*Assistant Examiner*—Ann T. Hoang
(74) *Attorney, Agent, or Firm*—Martin J. Moran

(57) ABSTRACT

Maintenance trip functions override the normal or specified trip functions of a low voltage circuit breaker to reduce pickup currents and/or time delays to effect faster trips, which reduces arc energy produced by faults during maintenance or testing on a live circuit breaker.

7 Claims, 3 Drawing Sheets

METHOD AND CIRCUIT BREAKER FOR REDUCING ARC FLASH DURING MAINTENANCE IN A LOW VOLTAGE POWER CIRCUIT

BACKGROUND OF THE INVENTION

1. Field of the Invention

Aspects of the invention relate to providing increased protection for personnel working on low voltage electric power circuits, and more particularly, to providing a maintenance trip function that overrides the normal trip function to reduce arc energy in faults occurring during maintenance.

2. Background Information

Often, maintenance personnel need to work on low voltage electric power circuits that are energized, for instance, when testing circuit breakers. The circuit breakers have trip functions designed to protect the power system from overloads and overcurrents. These trip functions typically include a delayed trip function that allows downstream breakers closer to the fault to respond first in order to limit interruption of service. The delayed trip function also permits temporary overloads such as those associated with the starting current of large motors.

The coordination between circuit breakers can be enhanced by zone interlocking in which a breaker lower in the protection hierarchy sends a signal that it detects a fault to an upstream breaker to temporarily block operation of the latter breaker giving the downstream breaker time to respond. Absence of a zone interlock signal from the lower breaker indicates that the fault is above the lower breaker allowing the higher breaker to respond more quickly.

Often, the power breaker will also have an instantaneous trip function that responds without delay to very high currents, such as those associated with the short circuit. These breakers can also have a ground fault trip function that typically also incorporates a delay time.

Maintenance and test personnel can be exposed to live terminals when working or making measurements on energized gear. The potential for arc flash resulting from an accidental fault requires that personnel wear protective clothing while working on energized gear.

SUMMARY OF THE INVENTION

In accordance with one aspect of the invention, the normal or specified trip functions of the circuit breaker are overridden by a maintenance trip function that results in reduced arc energy in a fault during a trip over the arc energy that would be generated during a trip with the specified or normal trip function. In this manner, should a fault occur while personnel are working on or making measurements on the power circuit, the circuit breaker will trip sooner and thereby expose the personnel to a lower level of arc energy. Where the specified trip function comprises a specified pickup current and specified time delay, overriding the specified trip function can comprise reducing the specified pickup current and/or the specified time delay. Where a circuit breaker may have one or more of an instantaneous trip function, a short delay trip function and a ground fault trip function implemented, each of the implemented trip functions is overridden by the maintenance trip function. Thus, for a short delay trip function, the time delay can be reduced or eliminated and the short delay pickup current can also be reduced. Likewise, the ground fault time delay can be reduced or eliminated and the ground fault pickup current can be reduced. The instantaneous trip function is overridden by reducing the specified instantaneous pickup current.

In some applications, it may be desirable to have higher settings for the maintenance trip function, such as for instance to accommodate motor starting currents. In this case, two maintenance trip functions may be provided with the first maintenance trip function providing a higher level of protection that results in a first level of arc energy in a fault during a trip that is less than the arc energy resulting from the specified trip function of the breaker and a second maintenance trip function that results in a second level of arc energy in the fault that is more than the first level of arc energy but less than the arc energy that would result from the specified trip function. For multiphase applications, the maintenance trip function can also cause a trip in response to a current imbalance in the multiple phases. Also, the maintenance trip function can cause a trip in response to a current reversal in the low voltage circuit. Where the specified trip function incorporates a jumpered zone interlock providing a specified delay, overriding the specified trip function comprises eliminating the delay time which can be implemented by open circuiting the jumpered interlock. The specified trip function can be overridden by providing an independent maintenance trip function in parallel with the specified trip function. Also, the specified trip function can be overridden by substituting the maintenance trip function for the specified trip function which is retained, for instance by storing, so that it is available to be restored following maintenance.

Another aspect of the invention is directed to a low voltage circuit breaker protecting from arc flash resulting from faults in a protected low voltage power circuit that comprises: separable contacts, current sensors sensing current in the protected low voltage power circuit, a trip unit responsive to the current sensors tripping open the separable contacts in response to a specified trip function, and means overriding the specified trip function with a maintenance trip function that reduces arc flash energy below arc flash energy associated with the specified trip function. The maintenance means can comprise a maintenance switch operable between a normal position selecting the specified trip function and a maintenance position selecting the maintenance trip function.

In accordance with one aspect of the invention, the maintenance means can comprise a maintenance plug insertable in the circuit breaker to implement the maintenance trip function. This maintenance plug can comprise a maintenance trip circuit producing a trip at a lower current level than the specified trip function. This maintenance trip circuit can comprise a zener diode. As applied to a multiphase level circuit breaker, the current sensors can include an auctioneering circuit that selects the highest current for implementing the maintenance trip function. The trip function of the circuit breaker can comprise a microprocessor providing the specified trip function and the maintenance trip circuit can be implemented in parallel with the trip unit.

In accordance with another aspect of the invention, where the trip unit incorporates a zone interlock and the specified trip function is a short delay trip function, the maintenance means open circuits the interlock and eliminates the delay of the short delay.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
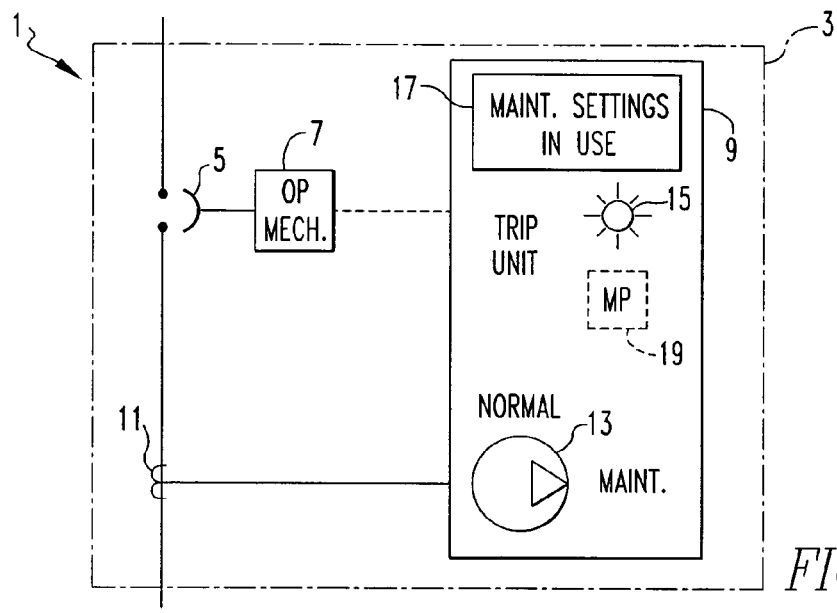
FIG. 1 is a schematic diagram of a low voltage circuit breaker in accordance with one embodiment of the invention providing protection in a low voltage power circuit.

FIG. 1 illustrates a low power electric circuit 1 being protected by a lower voltage circuit breaker 3. The circuit breaker 3 has separable contacts 5 that are opened and closed by an operating mechanism 7. A trip unit 9 monitors the current in the power circuit 1 as measured by current sensors 11 such as current transformers, and actuates the operating mechanism 7 to automatically open the separable contacts 5 when the current meets the criteria of specified normal trip functions implemented by the trip unit 9. FIG. 1 is depicted in single line format although typically the power circuit 1 and circuit breaker 3 will be three phase.

Various known trip functions can be implemented by the trip unit 9 as the specified trip functions. Typically, main and feeder circuit breakers in the low voltage power circuit 1 have a short delay trip function with a specified pickup current and specified time delay. These parameters are selected so that circuit breakers lower in the power circuit and closer to a fault have time to respond first. As mentioned above, this limits disruption of the power circuit by only disconnecting the affected portion of the circuit. Often, such circuit breakers will also have a ground fault trip function as a specified trip function that typically has a specified ground fault pickup current and specified ground fault time delay. Some circuit breakers will also have an instantaneous trip function with a specified instantaneous pickup current. If this instantaneous pickup current value is exceeded, the trip unit actuates the operating mechanism to open the separable contacts 5 without delay.

The maximum continuous current that the circuit breaker is designed to sustain is commonly referred to as the frame rating. In order that a single circuit breaker design can be adapted for a number of applications, it is common for the manufacturer to provide in the circuit breaker a rating plug which sets the maximum current at a selected value below the frame rating. As an example, the following are typical values for the specified trip functions in the low voltage circuit breaker 1.

Instantaneous trip=10×rated current
Short Delay Pickup=8×rated current
Short Time Delay=0.5 sec
Ground Fault Pickup Current=0.5×rated current
Ground Fault Time Delay=0.5 sec As mentioned, at times it is necessary for maintenance personnel or technicians to perform work or take measurements on the low voltage circuit breaker or its connected buses while the low voltage circuit 1 is energized. There is a possibility that during such work a fault could occur that would expose the workers to arc flash. In order to reduce the severity of this exposure, aspects of the present invention are directed toward overriding the above described specified trip functions with a maintenance trip function that reduces arc energy should a fault occur. The maintenance trip function reduces the pickup currents of the specified trip functions and/or reduces or eliminates the time delays of the specified trip functions. Continuing the example above, the following maintenance trip functions can be implemented.

Instantaneous Pickup Current=2×rated current
Short Delay Pickup=1.5×rated current
Short Time Delay=0.050 sec (essentially no time delay)
Ground Fault Pickup=0.25×rated current
Ground Fault Time Delay=0.050 sec (essentially no time delay)

If desired, additional protection settings may be included in the maintenance trip function, such as an amp unbalance trip with no time delay when there is an unbalance of 25% or more between phase currents. In addition, the maintenance trip function can include a reverse power trip when power flows in the reverse direction, for instance, when 1 kw flows in the reverse direction for one second. This reverse power trip will sense motor feedback into the arc fault.

As shown in FIG. 1, the specified or normal trip functions can be overridden by the maintenance trip functions through actuation of a maintenance switch 13, which may be provided directly on the trip unit where the trip unit 9 is accessible at the front of the circuit breaker 3. A light emitting diode (LED) 15 can be energized with the maintenance switch in the maintenance position to alert personnel of the change in the trip function. Other means for signaling the implementation of the maintenance trip functions can be provided such as a text message where the trip unit has a visual display 17.

Figure 2:
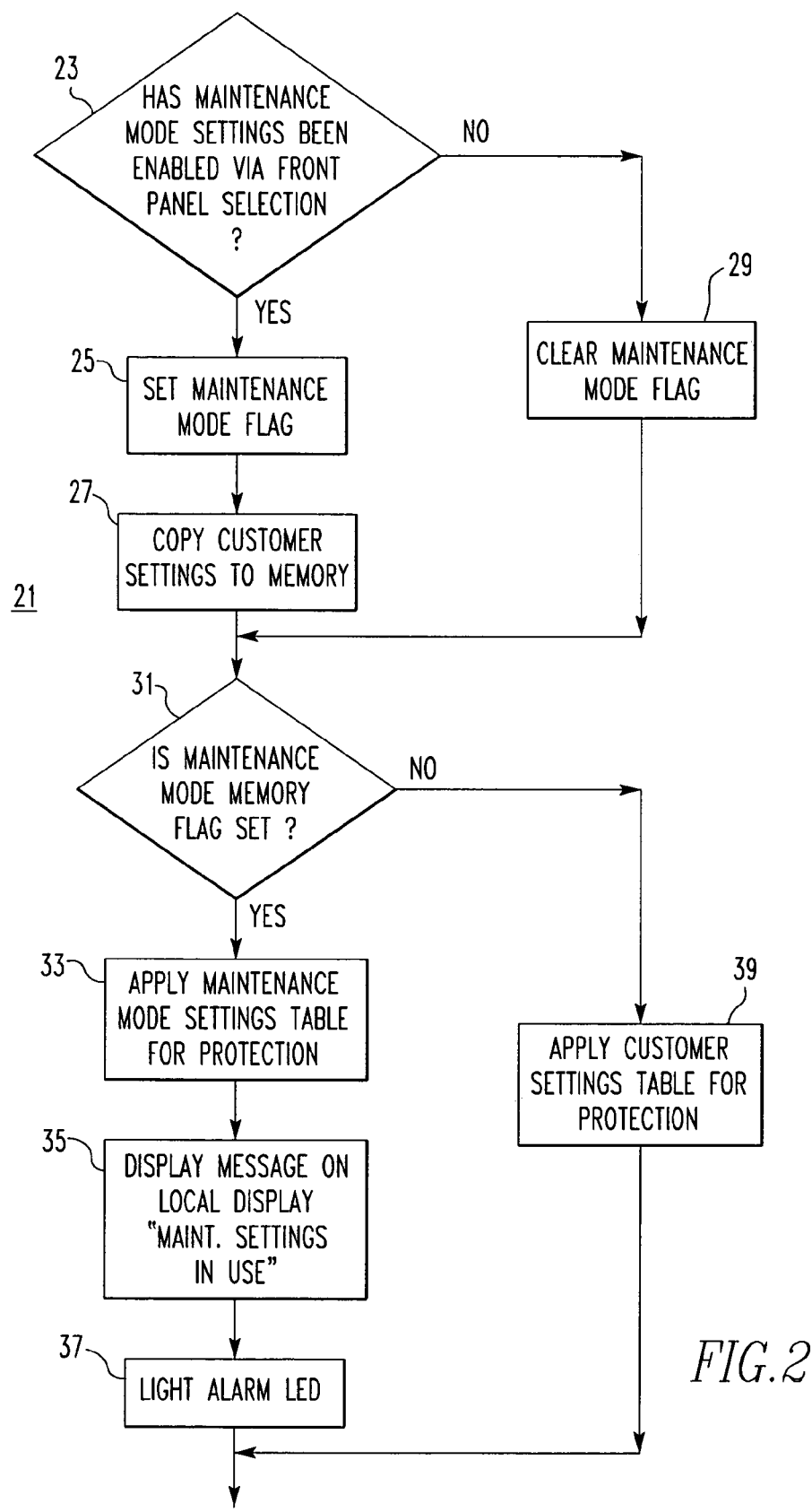
FIG. 2 is a flow chart illustrating the operation of the circuit breaker of FIG. 1.

State-of-the-art trip units utilize a microprocessor to implement the trip functions. FIG. 2 is a flow chart of an exemplary routine used by the microprocessor 19 for switching between the specified trip functions, or "customer settings" and the maintenance trip functions or "maintenance mode settings" in response to the setting of the maintenance switch 13. If the maintenance switch 13 has been set to the maintenance mode as determined at 23, a maintenance mode flag is set at 25 and the customer settings associated with the specified trip functions are copied to memory at 27. If at 23, the maintenance switch is in the normal position, the maintenance mode flag is cleared at 29. If the maintenance mode flag is set at 31, the maintenance mode settings, i.e., the maintenance trip functions, are applied at 33 and the "maintenance settings in use" message is displayed on the display 17 at 35 and the LED 15 is eliminated at 37. On the other hand, if the maintenance mode flag is not set at 31, the customer settings are applied at 39 so that the specified trip functions are implemented.

In accordance with another aspect of the invention, the maintenance trip functions can include multiple levels of protection. In some applications, it may be desirable to raise the parameters for tripping during maintenance, for instance, to accommodate the starting of motors. For example, in such a case, the maintenance settings listed above can be designated Level 1 maintenance settings, and the following exemplary maintenance settings can be provided as Level 2 settings.

Instantaneous Pickup Current=4×rated current
Short Delay Pickup Current=3×rated current
Short Delay Pickup Time=0.050 sec (essentially no time delay)
Ground Fault Pickup Current=0.25×rated current
Ground Fault Time Delay=0.050 sec (essentially no time delay)

Figure 3:
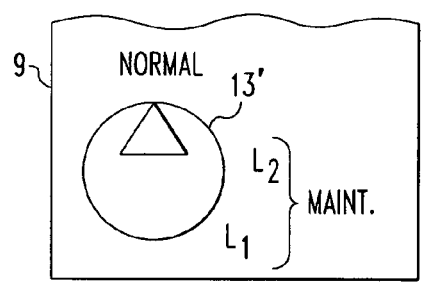
FIG. 3 is a fragmentary view of a modified form of the trip unit which forms part of the circuit breaker of FIG. 1 in accordance with another embodiment of the invention.

FIG. 3 is a fragmentary view of the trip unit showing a modified maintenance switch 13' in which either Level 1, or Level 2, can be selected as the maintenance trip function.

Additional maintenance settings can include a default time at which the system will revert to the "customer setting" or specified trip functions to restore normal operation should personnel neglect to manually return the maintenance switch to the normal position.

In addition to, or in place of, the maintenance switch 13 on the circuit breaker 3 overriding of the specified trip functions by the maintenance trip functions could be implemented remotely over a communication system (not shown), which is now often provided for low voltage power circuit breakers.

Figure 4:
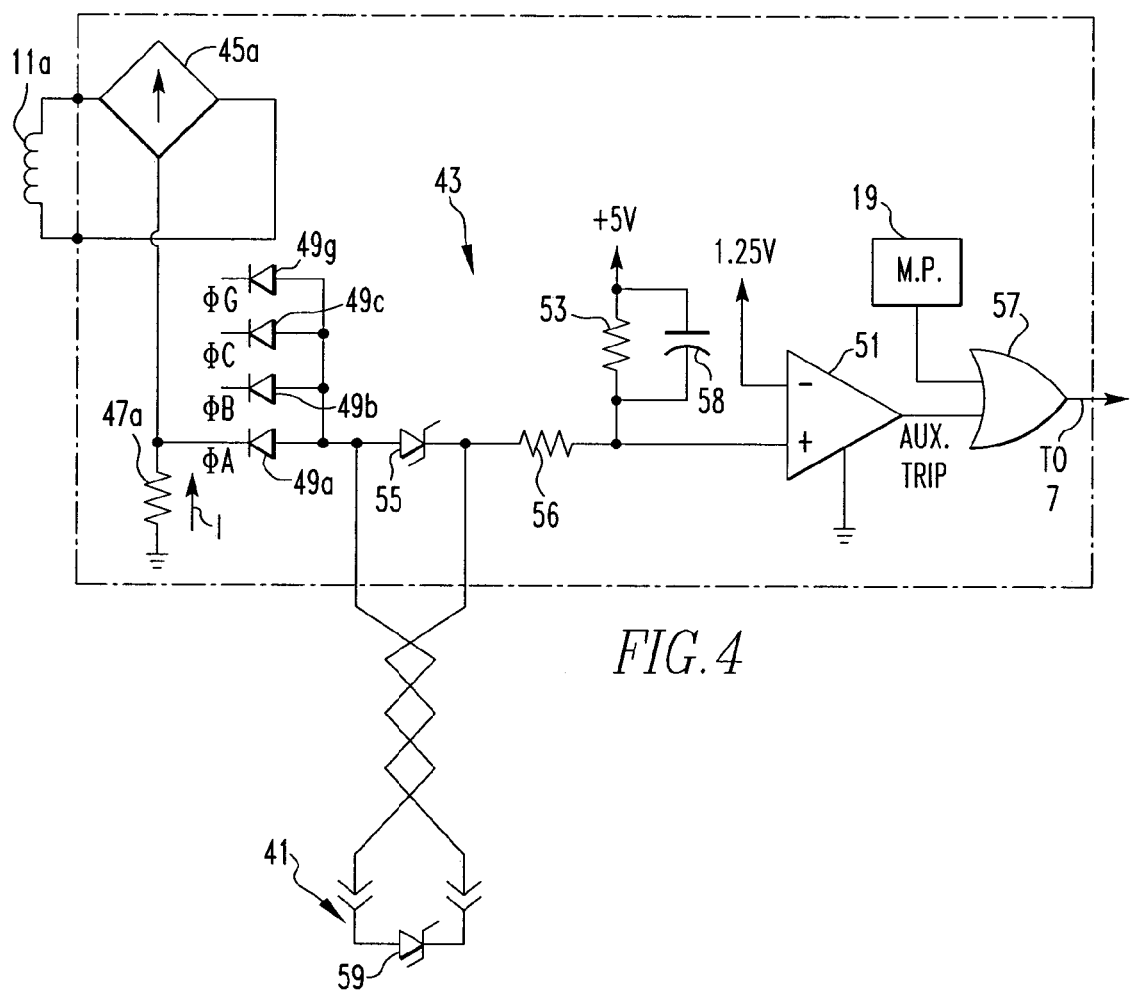
FIG. 4 is a schematic circuit diagram of another embodiment of the invention.

FIG. 4 illustrates another embodiment of the invention that employs a maintenance plug 41 in an auxiliary trip circuit 43 to override the specified trip functions implemented by the microprocessor 19. Current transformer 11a senses the current in phase A of the electric power circuit 1. This ac sensing current is converted to a dc current by the bridge circuit 45a and to a voltage proportional to the phase A current by the burden resistor 47a. Similar sensors (not shown) measure the phases B and C and ground fault currents. An auctioneering circuit formed by the diodes 49a, 49b, 49c and 49g selects the voltage representing the highest current as is well known. The number of turns of the current transformer for the ground current is selected to normalize it with the phase currents for auctioneering. The auxiliary trip circuit 43 includes a comparator 51, the output of which is normally low because the 5 volt voltage applied to the noninverting input through the pull down resistor 53 is above the 1.25 volt bias voltage applied to the inverting input. However, when the highest voltage selected by the auctioneering diodes 49a, 49b, 49c, and 49g representing the highest of the phase or ground currents, is above the breakdown voltage of zener diode 55, current flows through the resistor 56 and pulls down the voltage on the noninverting input of the comparator 51 to cause the output to go high. This auxiliary trip signal is ORed in OR circuit 57 with the trip signal generated by the microprocessor 19 to actuate the operating mechanism 7 and open the separable contacts 5. Filter capacitor 58 suppresses spurious response. Such an auxiliary trip circuit is now provided in some circuit breakers 3 to provide a fast instantaneous trip for very high overcurrents. This assures a fast trip, for instance in the case of a short circuit, without the delays inherent in the processing required for the microprocessor 19 to generate a trip signal.

In accordance with this aspect of the invention, the auxiliary trip circuit 43 becomes a maintenance trip circuit by insertion of the maintenance plug 41 to place a maintenance zener diode 59 in parallel with the auxiliary trip zener diode 55. The maintenance zener diode 59 has a break over voltage selected to generate the auxiliary trip signal at the reduced maintenance instantaneous pickup current described above. This embodiment of the invention is particularly suitable for applying aspects of the invention to existing circuit breakers, especially those that already have the auxiliary trip function.

Figure 5:
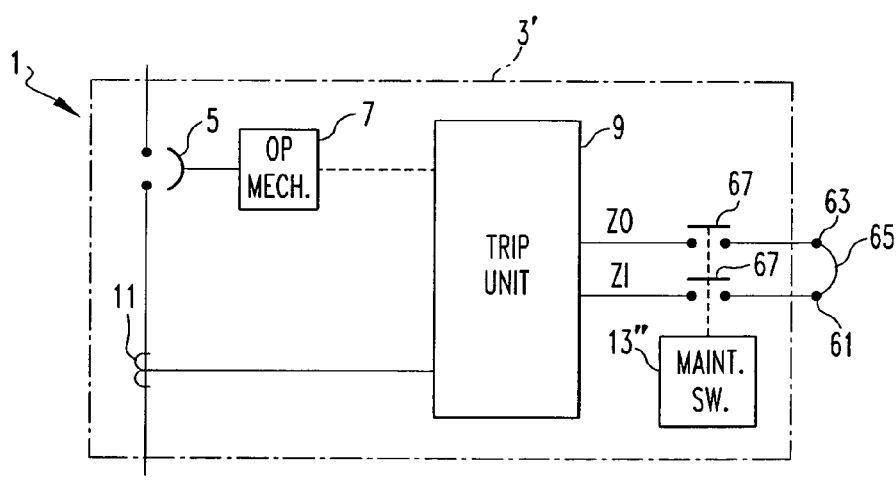
FIG. 5 is a schematic diagram illustrating implementation of the invention in a low voltage circuit breaker incorporating zone interlock in accordance with yet another embodiment of the invention.

It was previously mentioned that some circuit breakers have an interlock function. FIG. 5 illustrates such a circuit breaker 3'. In such a circuit breaker, the trip unit 9 has an interlock in ZI, and an interlock out, ZO, lead. The interlock in lead ZI can be connected at a terminal 61 through a lead (not shown) to a circuit breaker (not shown) lower in the electric power circuit 1. Similarly, the interlock out, ZO lead can be connected at a terminal 63 through another lead (not shown) to a circuit breaker (not shown) higher in the electric power circuit 1. When the circuit breaker 3' is so connected, if the circuit breaker (not shown) lower in the electric power circuit sees a fault, it will send an interlock signal through the lead ZI to the trip unit 9 to hold off tripping of the circuit breaker 3', thereby giving the lower circuit breaker the opportunity to respond such as by a short delay trip. The circuit breaker 3' also sends an interlock signal upward through the lead ZO to the circuit breaker above to hold off actuation of that breaker should the breaker 3' see a fault. For ease of manufacture, the zone interlock connections are provided on all of the breakers of the type such as 3'. Should a customer not care to implement zone interlocking, a jumper 65 is connected across the terminal 61, 63 to activate the short time delay in the trip unit 9 of the circuit breaker 3'. In accordance with this aspect of the invention, the maintenance switch 13" has contacts 67 which interrupt the interlock circuit to eliminate the time delay thereby producing a maintenance trip function that responds without delay to reduce arc energy should a fault occur during maintenance. When maintenance has been completed, the maintenance switch 13" is returned to the closed position to reinstitute the time delay, or the interlock function.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of providing protection against arc flash during maintenance on a low voltage power circuit including a circuit breaker having a specified trip function for responding to a fault, the method comprising:
   overriding the specified trip function with a maintenance trip function that results in reduced arc energy in the fault during a trip over arc energy during a trip with the specified trip function; and
   restoring the specified trip function following maintenance,
   wherein the specified trip function incorporates a jumpered zone interlock providing a specified delay and overriding the specified trip function comprises eliminating the specified delay, and
   wherein eliminating the specified delay comprises open circuiting the jumpered zone interlock.

2. A method of providing protection against arc flash during maintenance on a low voltage power circuit including a circuit breaker having a specified trip function for responding to a fault, the method comprising:
   overriding the specified trip function with a maintenance trip function that results in reduced arc energy in the fault during a trip over arc energy during a trip with the specified trip function; and
   restoring the specified trip function following maintenance, wherein overriding the specified trip function comprises providing an independent maintenance trip function in parallel with the specified trip function.

3. A low voltage circuit breaker protecting from arc flash resulting from faults in a protected low voltage power circuit comprising:

separable contacts;

current sensors sensing current in the protected low voltage power circuit;

a trip unit responsive to the current sensors tripping open the separable contacts in response to a specified trip function; and maintenance means overriding the specified trip function with a maintenance trip function that results in reduced arc energy in the fault during a trip over arc energy during a trip with the specified trip function, wherein the maintenance means comprises a maintenance plug insertable in the circuit breaker to implement the maintenance trip function.

4. The circuit breaker of claim 3, wherein the maintenance plug comprises part of a maintenance trip circuit producing a trip at a lower current level than the specified trip function.

5. The circuit breaker of claim 4 for a multiphase low voltage power circuit, wherein the circuit breaker includes an auctioneering circuit that selects a highest phase current for the maintenance trip function.

6. The circuit breaker of claim 5, wherein the trip unit comprises a microprocessor providing the specified trip function and the maintenance trip circuit is in parallel with the trip unit.

7. The circuit breaker of claim 4, wherein the maintenance trip circuit comprises a Zener diode that sets the lower current level.

* * * * *

UNITED STATES PATENT AND TRADEMARK OFFICE
CERTIFICATE OF CORRECTION

PATENT NO. : 7,203,040 B2
APPLICATION NO. : 10/814596
DATED : April 10, 2007
INVENTOR(S) : David D. Shipp et al.

Page 1 of 1

It is certified that error appears in the above-identified patent and that said Letters Patent is hereby corrected as shown below:

Title Page, Column 1, Item (73) Assignee, "Gaton" should read --Eaton--.

Signed and Sealed this
Twenty-third Day of July, 2013

Teresa Stanek Rea
*Acting Director of the United States Patent and Trademark Office*